（12）United States Patent
Yang

(10) Patent No.: US 12,027,903 B2
(45) Date of Patent: Jul. 2, 2024

(54) WIRELESS POWER TRANSFER SYSTEM AND METHOD

(71) Applicant: Huawei Digital Power Technologies Co., Ltd., Shenzhen (CN)

(72) Inventor: Songnan Yang, Frisco, TX (US)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 452 days.

(21) Appl. No.: 17/473,256

(22) Filed: Sep. 13, 2021

(65) Prior Publication Data

US 2021/0408818 A1 Dec. 30, 2021

Related U.S. Application Data

(63) Continuation of application No. PCT/US2019/047711, filed on Aug. 22, 2019.

(51) Int. Cl.
*H02J 7/00* (2006.01)
*H01M 10/44* (2006.01)
(Continued)

(52) U.S. Cl.
CPC ......... *H02J 7/00714* (2020.01); *H01M 10/44* (2013.01); *H02J 7/007182* (2020.01); *H02J 50/12* (2016.02); *H02M 3/07* (2013.01); *H02M 3/1584* (2013.01); *H02J 2207/40* (2020.01); *H02M 1/0058* (2021.05); *H02M 3/01* (2021.05); *H02M 3/33571* (2021.05)

(58) Field of Classification Search
CPC .. H02J 7/00714; H02J 7/007182; H02J 50/12; H02J 2207/40; H01M 10/44; H02M 3/07; H02M 3/1584; H02M 1/0058; H02M 3/01; H02M 3/33571; H02M 1/007; Y02B 70/10; Y02E 60/10
USPC ....................................... 320/128
See application file for complete search history.

(56) References Cited

U.S. PATENT DOCUMENTS

2015/0207336 A1  7/2015  Morreale et al.
2022/0399736 A1* 12/2022 Sabatier ............... H01M 10/44
2023/0047446 A1*  2/2023 Liu ....................... H02M 1/007

FOREIGN PATENT DOCUMENTS

CN   108233454 A   6/2018
CN   108539832 A   9/2018
(Continued)

*Primary Examiner* — Paul Dinh
(74) *Attorney, Agent, or Firm* — Slater Matsil, LLP

(57) ABSTRACT

A method includes charging a battery through a first charger and a second charger connected in parallel, during a first transition from a constant current charging phase to a constant voltage charging phase, enabling the second charger at a first time instant and disabling the first charger at a second time instant, the second time instant being after the first time instant, and during the constant voltage charging phase, enabling the first charger at a third time instant upon detecting that a current flowing the battery is less than a predetermined current threshold and disabling the second charger at a fourth time instant, the fourth time instant being after the third time instant, wherein the first charger and the second charger are configured to charge the battery simultaneously between the first time instant and the second time instant, and between the third time instant and the fourth time instant.

20 Claims, 6 Drawing Sheets

(51) Int. Cl.
*H02J 50/12* (2016.01)
*H02M 3/07* (2006.01)
*H02M 3/158* (2006.01)
H02M 1/00 (2006.01)
H02M 3/00 (2006.01)
H02M 3/335 (2006.01)

(56) References Cited

FOREIGN PATENT DOCUMENTS

| | | |
|---|---|---|
| CN | 109148990 A | 1/2019 |
| WO | 2018099257 A1 | 6/2018 |

\* cited by examiner

WIRELESS POWER TRANSFER SYSTEM AND METHOD

CROSS-REFERENCE TO RELATED APPLICATIONS

This application is a continuation of Application No. PCT/US2019/047711, filed on Aug. 22, 2019, which application is hereby incorporated herein by reference in its entirety.

TECHNICAL FIELD

The present disclosure relates to a method for efficiently charging a battery, and, in particular embodiments, to a method for efficiently charging a battery through a wireless power transfer system.

BACKGROUND

As technologies further advance, wireless power transfer has emerged as an efficient and convenient mechanism for powering battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver. The primary side transmitter is configured to generate an alternating current on the primary side coil to form a varying magnetic field, thereby generating a voltage in the secondary side coil.

The primary side transmitter may comprise a power conversion unit such as a primary side of a power converter. The power conversion unit is coupled to a power source and is capable of converting electrical power to wireless power signals applied to the primary side coil. The secondary side receiver receives the wireless power signals through the secondary side coil and converts the received wireless power signals to electrical power suitable for a load such as the battery pack of a mobile phone.

The secondary side receiver may comprise a buck charger that converts the output voltage of a rectifier to a suitable voltage for charging a rechargeable battery. The buck charger is a simple and reliable circuit for charging the rechargeable battery. However, the maximum efficiency of the buck charger is quite low in comparison with other chargers such as switched capacitor chargers. It is desirable to have a high efficiency charger for charging the rechargeable battery.

SUMMARY

These and other problems are generally solved or circumvented, and technical advantages are generally achieved, by preferred embodiments of the present disclosure which provide a method for efficiently charging a battery through a wireless power transfer system.

In accordance with an embodiment, a method comprises charging a battery through a first charger and a second charger connected in parallel, during a first transition from a constant current charging phase to a constant voltage charging phase, enabling the second charger at a first time instant and disabling the first charger at a second time instant, the second time instant being after the first time instant, wherein the first charger and the second charger are configured to charge the battery simultaneously between the first time instant and the second time instant, and during the constant voltage charging phase, enabling the first charger at a third time instant upon detecting that a current flowing the battery is less than a predetermined current threshold and disabling the second charger at a fourth time instant, the fourth time instant being after the third time instant, wherein the first charger and the second charger are configured to charge the battery simultaneously between the third time instant and the fourth time instant.

The first charger is a buck converter, and the second charger is a switched capacitor converter. Power for charging the battery is from a wireless power transfer system comprising a transmitter circuit connected between an output of an adaptor and a transmitter coil, a rectifier connected to a receiver coil magnetically coupled to the transmitter coil, a DC/DC converter having inputs connected to outputs of the rectifier, and the first charger and the second charger connected in parallel between the DC/DC converter and the battery.

The method further comprises applying a pre-charge charging phase to the battery upon detecting that a voltage of the battery is below a first voltage threshold, applying the constant current charging phase to the battery upon detecting that the voltage of the battery is between the first voltage threshold and a second voltage threshold, applying a fast current charging phase to the battery after the voltage of the battery is greater than the second voltage threshold, maintaining a current flowing through the battery approximately equal to the battery current charging limit, while increasing the voltage of the battery, upon detecting that the current flowing through the battery has reached a battery current charging limit, and applying the constant voltage charging phase to the battery upon detecting that the voltage of the battery reaches a third voltage threshold.

The method further comprises during the constant voltage charging phase, enabling the first charger upon detecting that the current flowing through the battery drops below the predetermined current threshold.

The method further comprises during the constant current charging phase, configuring the DC/DC converter to operate in a bypass mode upon detecting that the voltage of the battery is less than a predetermined voltage threshold, and configuring the DC/DC converter to operate as a 2:1 power conversion device upon detecting that the voltage of the battery is greater than the predetermined voltage threshold.

The method further comprises during the constant voltage charging phase, configuring the DC/DC converter to operate as a 2:1 power conversion device upon detecting that the voltage of the battery is greater than the predetermined voltage threshold, and configuring the DC/DC converter to operate in the bypass mode upon detecting that the first charger has entered into a trickle charging mode.

The method further comprises during the constant current charging phase and the constant voltage charging phase, configuring the rectifier to operate in a synchronous rectifier mode through enabling the second charger before disabling the first charger during the first transition, and enabling the first charger before disabling the second charger during the constant voltage charging phase.

In accordance with another embodiment, a system comprises a rectifier configured to receive power wirelessly from a transmitter through a transmitter coil and receiver coil, a direct current (DC) to DC (DC/DC) converter coupled, directly or indirectly, to the rectifier, the DC/DC converter configured to accept an output voltage from an output of the rectifier, a closed-loop charger and an open-loop charger connected in parallel between an output of the DC/DC converter and a load, and a controller coupled, directly or indirectly, to the closed-loop charger and the open-loop charger, the controller configured to selectively enable one of the closed-loop charger and the open-loop charger during different charging phases, and enable both the closed-loop charger and the open-loop charger during a transition period between the different charging phases.

The closed-loop charger comprises a buck charger. The open-loop charger comprises a switched capacitor charger. The DC/DC converter is a 2:1 power converter.

The closed-loop charger is enabled during a constant current charging phase, the open-loop charger is enabled during a constant voltage charging phase, and the closed-loop charger and the open-loop charger are configured to charge a battery simultaneously during a transition period between the constant current charging phase and the constant voltage charging phase.

In accordance with yet another embodiment, a method comprises receiving power wirelessly at a rectifier from a transmitter through an inductive coupling formed by a transmitter coil and a receiver coil, generating a direct current (DC) voltage by the rectifier, applying the DC voltage to a closed-loop charger and an open-loop charger through a DC to DC (DC/DC) converter, during a first charger transition period, enabling the open-loop charger before disabling the closed-loop charger, wherein as a result of enabling the open-loop charger before disabling the closed-loop charger, the closed-loop charger and an open-loop charger are configured to charge a battery simultaneously during the first charger transition period, and during a second charger transition period, enabling the closed-loop charger before disabling the open-loop charger, wherein as a result of enabling the closed-loop charger before disabling the open-loop charger, the closed-loop charger and an open-loop charger are configured to charge the battery simultaneously during the second charger transition period.

The method further comprises charging the battery to a targeted voltage through a pre-charge charging phase, a constant current charging phase, a constant voltage charging phase and a trickle charging phase.

The first charger transition period occurs between the constant current charging phase and the constant voltage charging phase. The second charger transition period occurs in the constant voltage charging phase.

An advantage of an embodiment of the present disclosure is that the control method of the present disclosure is able to efficiently charge a battery through using a wireless power transfer system having a buck charger and a switched capacitor charger connected in parallel. The buck charger is enabled during the constant current mode, and the switched capacitor charger is disabled during the constant current mode. The switched capacitor charger is enabled during the constant voltage mode, and the buck charger is disabled during the constant voltage mode. During the transition between the buck charger and the switched capacitor charger, both the buck charger and the switched capacitor charger are enabled. The buck charger and the switched capacitor charger are configured to charge the battery simultaneously during the transition period. Enabling both the buck charger and the switched capacitor charger during the transition period helps to improve the performance of the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for efficiently charging a battery through a wireless power transfer system. The present disclosure may also be applied, however, to a variety of energy transfer systems. Hereinafter, various embodiments will be explained in detail with reference to the accompanying drawings.

Figure 1:
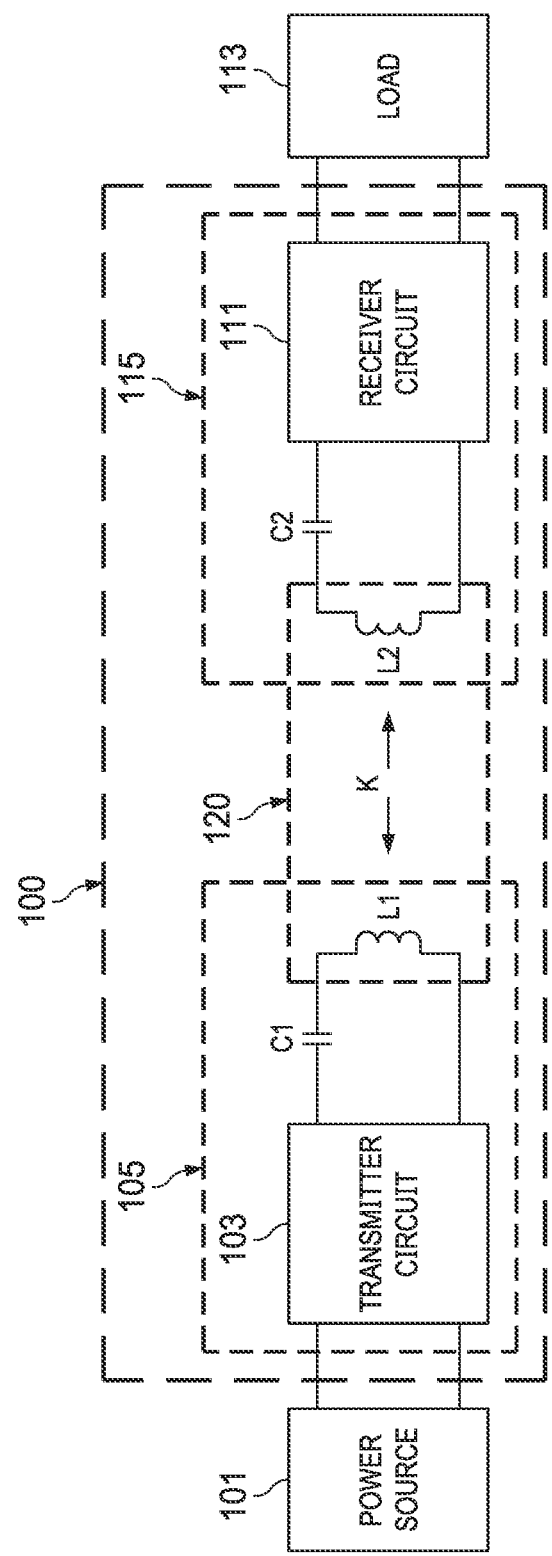
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 is connected between a power source 101 and a load 113. The wireless power transfer system 100 includes a transmitter 105 and a receiver 115. As shown in FIG. 1, the transmitter 105 comprises a transmitter circuit 103, a primary capacitor C1 and a primary coil L1 connected in cascade. Throughout the description, the primary coil L1 may be alternatively referred to as a transmitter coil. The input of the transmitter circuit 103 is connected to the power source 101. It should be noted that depending on different applications and design needs, a suitable power converter may be connected between the power source 101 and the transmitter circuit 103.

The receiver 115 comprises a secondary coil L2, a secondary capacitor C2 and a receiver circuit 111. The secondary capacitor C2 and the receiver circuit 111 are connected in cascade between the secondary coil L2 and the load 113. As shown in FIG. 1, the output of the receiver circuit 111 is coupled to the load 113. Throughout the description, the secondary coil L2 may be alternatively referred to as a receiver coil.

The transmitter 105 is magnetically coupled to the receiver 115 through a magnetic field when the receiver 115 is placed adjacent to the transmitter 105. A loosely coupled transformer 120 is formed by the transmitter coil L1, which is part of the transmitter 105, and the receiver coil L2, which is part of the receiver 115. As a result, power may be transferred from the transmitter 105 to the receiver 115.

In some embodiments, the transmitter 105 may be inside a charging pad. The transmitter coil is placed underneath the top surface of the charging pad. The receiver 115 may be embedded in a mobile phone. When the mobile phone is place adjacent to the charging pad, a magnetic coupling may be established between the transmitter coil and the receiver coil. In other words, the transmitter coil and the receiver coil may form a loosely coupled transformer through which the power is transferred between the transmitter 105 and the receiver 115. The strength of coupling between the transmitter coil L1 and the receiver coil L2 is quantified by the coupling coefficient K.

In some embodiments, after the magnetic coupling has been established between the transmitter coil L1 and the receiver coil L2, the transmitter 105 and the receiver 115 may form a power system through which power is wirelessly transferred from the power source 101 to the load 113.

The primary capacitor C1 functions as a resonant capacitor. The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire. The secondary capacitor C2 functions a secondary resonant capacitor. The function of the secondary capacitor C2 is similar to that of the primary capacitor C1, and hence is not discussed herein to avoid repetition. The primary capacitor C1 and the secondary capacitor C2 are employed to achieve soft switching, thereby improving the efficiency of the wireless power transfer system 100.

The power source 101 may be a power adapter converting a utility line voltage to a direct-current (DC) voltage. Alternatively, the power source 101 may be a renewable power source such as a solar panel array. Furthermore, the power source 101 may be an energy storage device such as rechargeable batteries, fuel cells and/or the like.

The load 113 represents the power consumed by the mobile device (e.g., a mobile phone) coupled to the receiver 115. Alternatively, the load 113 may refer to a rechargeable battery and/or batteries connected in series/parallel, and coupled to the output of the receiver 115.

According to some embodiments, the transmitter circuit 103 may comprise primary side switches of a half-bridge converter and the associated driving and control circuits. Alternatively, the transmitter circuit 103 may comprise the primary side switches of other converters such as a full-bridge converter, a push-pull converter and the like.

It should be noted that the converters described above are merely examples. One having ordinary skill in the art will recognize other suitable power converters such as class E topology based power converters (e.g., a class E amplifier), may alternatively be used.

In some embodiments, the receiver circuit 111 may comprise as a rectifier and a plurality of downstream power converters. The rectifier converts an alternating polarity waveform received from the output of the receiver coil L2 to a single polarity waveform. In some embodiments, the rectifier comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier are well known in the art, and hence are not discussed herein.

The plurality of downstream power converters connected between the rectifier and the load may be implemented as a battery charger. The battery charger may be implemented as any suitable power converters such as a buck power converter, a switched capacitor power converter, any combinations thereof and the like. Furthermore, a step-down power converter may be connected between the output of the rectifier and the input of the battery charger for improving the performance of the battery charger under various operation conditions. The detailed diagram of the plurality of downstream power converters will be described below with respect to FIG. 2.

Figure 2:
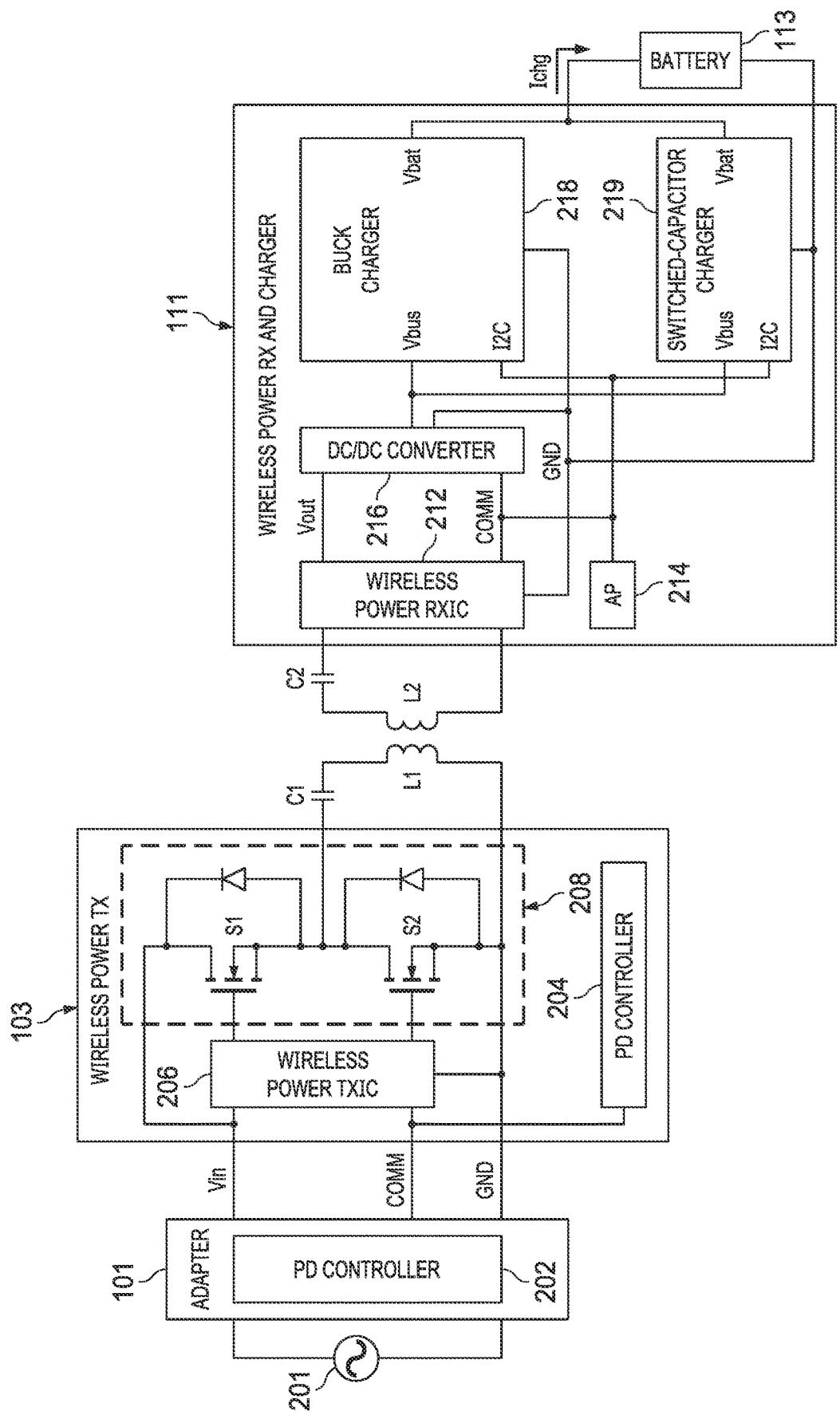
FIG. 2 illustrates additional details of the wireless power transfer system shown in FIG. 1 in accordance with various embodiments of the present disclosure.

FIG. 2 illustrates additional details of the wireless power transfer system shown in FIG. 1 in accordance with various embodiments of the present disclosure. The power source 101 is implemented as an adaptor. Throughout the description, the power source 101 may be alternatively referred to as an adaptor. The load 113 is implemented as a battery. Throughout the description, the load 113 may be alternatively referred to as a battery as shown in FIG. 2.

As shown in FIG. 2, the adaptor 101 includes a power delivery (PD) controller 202. The adaptor 101 may include an AC/DC converter (not shown) that converts an AC voltage provided by an AC power supply 201 into a DC input voltage (Vin). As shown in FIG. 2, the DC input voltage Vin is employed to power the transmitter circuit 103. The AC/DC converter may be implemented as any suitable AC/DC power conversion devices such as a full-wave rectifier and the like.

The PD controller 202 may include a plurality of control circuits such as a processor, a transceiver and the like. The transceiver is configured to send and receive communication signals to and from the transmitter circuit 103.

As shown in FIG. 2, the adaptor 101 includes three output terminals. A first terminal is denoted as Vin. The first terminal Vin of the adaptor 101 is connected to a first input terminal of the transmitter circuit 103. A second terminal is denoted as Comm. The second terminal of the adaptor 101 is configured to carry the communication signals flowing between the adaptor 101 and the transmitter circuit 103. A third terminal is denoted as Gnd. The third terminal of the adaptor 101 is connected to ground.

As shown in FIG. 2, the transmitter circuit 103 includes a PD controller 204, a wireless power transmitter integrated circuit (TXIC) 206, and a half-bridge converter 208. The half-bridge converter 208 is connected between a high voltage bus and ground. As shown in FIG. 2, the high voltage bus is connected to the first input terminal of the transmitter circuit 103. The first input terminal of the transmitter circuit 103 is connected to Vin.

The PD controller 204 may include a plurality of control circuits such as a processor, a transceiver and the like. The transceiver is configured to send and receive communication signals to and from the adaptor 101. In some embodiments, the PD controller 204 and the wireless power TXIC 206 can be integrated into a same silicon die. In alternative embodiments, the PD controller 204 and the wireless power TXIC 206 may be formed on two different silicon dies.

As shown in FIG. 2, the wireless power TXIC 206 has a first terminal configured to accept the input voltage Vin from the adaptor 101, and a second terminal configured to communicate with the PD controllers 202 and 204. The wireless power TXIC 206 is configured to generate gate drive signals for controlling switches S1 and S2 of the half-bridge converter 208. In some embodiments, the wireless power TXIC 206 may include a processor and a transceiver. The transceiver is configured to send and receive communication signals to and from the receiver circuit 111.

The half-bridge converter 208 comprises switches S1 and S2 connected in series between Vin and ground. The switches S1 and S2 are turned on and off at a predetermined switching frequency to generate an alternating voltage signal at a common node of the switches S1 and S2. The common node of the switches S1 and S2 is connected to the transmitter coil L1 through a resonant capacitor C1. The resonant capacitor C1 is employed to achieve soft switching, thereby improving the efficiency of the wireless power transfer system 100.

It should be noted that the converters described above are merely examples. One of ordinary skill in the art would recognize many variations, alternatives, and modifications. For example, a full-bridge converter that includes four switches can be used to replace the half-bridge converter 208 shown in FIG. 2.

The transmitter coil L1 and the receiver coil L2 form an inductive coupling between the transmitter circuit 103 and the receiver circuit 111. The inductive coupling can be used to transfer power from the transmitter circuit 103 to the receiver circuit 111. Furthermore, the inductive coupling may be used to provide in-band bidirectional wireless communications between the transmitter circuit 103 to the receiver circuit 111.

It should be noted that the inductive coupling shown in FIG. 2 is merely an example. One of ordinary skill in the art would recognize many variations, alternatives, and modifications. For example, the power is wirelessly transferred from the transmitter circuit 103 to the receiver circuit 111 using more than one transmitter coil. Similarly, it is also possible that more than one receiver coil be used to wirelessly receive power at the receiving side of the inductive coupling.

As shown in FIG. 2, the receiver circuit 111 includes an application processor (AP) 214, a wireless power receiver integrated circuit (RXIC) 212, a DC/DC converter 216, a buck charger 218 and a switched capacitor charger 219. The wireless power RXIC 212 is connected to the receiver coil L2 through a resonant capacitor C2. The resonant capacitor C2 is employed to achieve soft switching, thereby improving the efficiency of the wireless power transfer system 100.

As shown in FIG. 2, the receiver coil L2 is connected to the wireless power RXIC 212 through the resonant capacitor C2. The wireless power RXIC 212 converts an AC voltage generated by the receiver coil L2 into a DC output voltage (Vout). The output of the wireless power RXIC 212 is connected to the input of the DC/DC converter 216. The output of the DC/DC converter 216 is a voltage bus (Vbus). As shown in FIG. 2, the voltage bus Vbus is fed into the inputs of the buck charger 218 and the switched capacitor charger 219, respectively. The outputs of the buck charger 218 and the switched capacitor charger 219 are connected together and further applied to the battery 113. In other words, the buck charger 218 and the switched capacitor charger 219 are connected in parallel between the DC/DC converter 216 and the battery 113.

The wireless power RXIC 212 may be implemented as a rectifier. The rectifier is configured to convert the AC voltage generated by the receiver coil L2 into the DC output voltage Vout. Throughout the description, the wireless power RXIC 212 may be alternatively referred to as a rectifier.

In order to improve the efficiency of the wireless power transfer system, the rectifier may be implemented as a synchronous rectifier. The structure and the operating principle of the synchronous rectifier are well known in the art, and hence are not discussed in further detail herein.

For improving the light load efficiency of the wireless power transfer system, the rectifier may operate in three different modes. When the load of the wireless power transfer system is greater than a first predetermined load threshold (e.g., about 300 mA as shown FIG. 4), the rectifier operates in a full synchronous rectifier mode. When the load of the wireless power transfer system is between a second predetermined load threshold (e.g., about 100 mA as shown FIG. 4) and the first predetermined load threshold, the rectifier operates in a half synchronous rectifier mode. In the half synchronous rectifier mode, at least one switch of the rectifier emulates the operation of a diode so as to reduce the switching losses. When the load of the wireless power transfer system is less than the second predetermined load threshold, the rectifier operates in a diode rectifier mode. In the diode rectifier mode, all switches of the rectifier emulate the operation of diodes of a diode rectifier so as to reduce the switching losses. The detailed operation of the three different modes will be described below with respect to FIG. 4.

The DC/DC converter 216 is configured to convert the DC output voltage Vout into the bus voltage (Vbus). In some embodiments, the DC/DC converter 216 can be implemented as a 2:1 power conversion device such as a switched capacitor power converter. Configuring a switched capacitor converter as a 2:1 power conversion device is well known in the art, and hence is not discussed herein for avoiding repetition. Alternatively, the DC/DC converter 216 can be implemented as any suitable power conversion devices such as a 3:1 switched capacitor converter, a buck converter, a boost converter, a buck-boost converter, a low-dropout regulator (LDO), any combinations thereof and the like.

It should be noted that the DC/DC converter shown in FIG. 2 is merely an example. One of ordinary skill in the art would recognize many variations, alternatives, and modifications. For example, the DC/DC converter may be configured to operate in a bypass mode. As a result of configuring the DC/DC converter to operate in the bypass mode, the output of the wireless power RXIC 212 is connected to the output of the DC/DC converter 216 through an always-on switch.

The buck charger 218 is implemented as a buck converter. The efficiency of the buck converter is in a range from about 92% to about 93%. The buck converter comprises a high-side switch and a low-side switch connected in series between the input of the buck converter (Vbus) and ground. The buck converter further comprises an output inductor connected between a common node of the high-side switch and the low-side switch, and an output of the buck converter (Vbat). Configuring a buck converter as a buck charger for charging a battery is well known in the art, and hence is not discussed herein to avoid repetition.

The switched capacitor charger 219 is implemented as a switched capacitor converter. The efficiency of the buck converter is in a range from about 97% to about 98%. The switched capacitor converter comprises an input capacitor, a first switch, a second switch, a third switch, a fourth switch and an output capacitor. The switched capacitor converter further comprises a charge pump capacitor. The first switch, the second switch, the third switch and the fourth switch are connected in series between Vbus and ground. The charge pump capacitor is connected between a common node of the first switch and the second switch, and a common node of the third switch and the fourth switch. The input capacitor is connected between Vbus and ground. The output capacitor is connected between a common node of the second switch and the third switch, and ground. Configuring a switched capacitor converter as a switched capacitor charger for charging a battery is well known in the art, and hence is not discussed herein to avoid repetition.

The buck charger 218 is a closed-loop charger. In other words, the output voltage Vbat and/or current can be adjusted based on a feedback signal produced by the buck charger 218. The buck charger 218 can charge the battery 113 with a regulated current or voltage.

In comparison with the buck charger 218, the switched capacitor charger 219 is an open-loop charger. The switched capacitor charger 219 can achieve better charging efficiency. In some embodiments, the power conversion ratio of the switched capacitor charger 219 is 2:1.

The AP 214 can send and receive communication signals to and from the wireless power RXIC 246 and the DC/DC converter 216. In some embodiments, the AP 214 can utilize Inter-Integrated Circuit (I2C) serial bus communications to communicate with the switched capacitor charger 219 and the buck charger 218.

Figure 3:
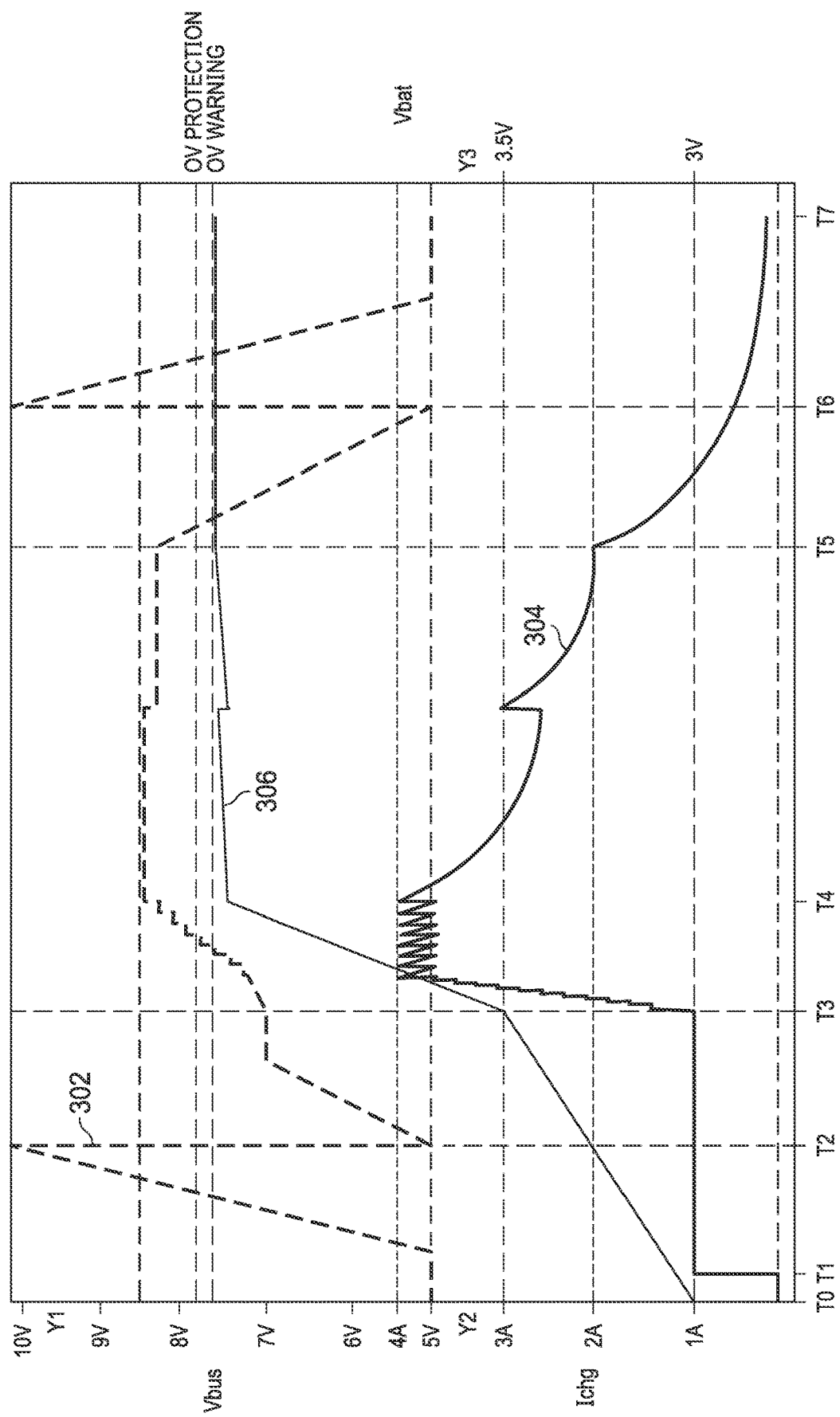
FIG. 3 illustrates an exemplary charging profile of the wireless power transfer system shown in FIG. 2 in accordance with various embodiments of the present disclosure.

FIG. 3 illustrates an exemplary charging profile of the wireless power transfer system shown in FIG. 2 in accordance with various embodiments of the present disclosure. The horizontal axis of FIG. 3 represents intervals of time. There are three vertical axes. The first vertical axis Y1 represents the output voltage of the DC/DC converter (Vbus). The second vertical axis Y2 represents the current flowing through the battery (Ichg). The third vertical axis Y3 represents the voltage across the two terminals of the battery (Vbat).

FIG. 3 illustrates three waveforms. A first waveform 302 is the output voltage of the DC/DC converter. The first waveform 302 includes two transition points. A first transition point occurs at T2. At the first transition point, the DC/DC converter leaves a bypass mode and enters into a 2:1 power conversion mode. A second transition point occurs at T6. At the second transition point, the DC/DC converter leaves the 2:1 power conversion mode and returns to the bypass mode. A second waveform 304 is the current flowing through the battery.

The second waveform 304 includes a constant current portion from T1 to T3. The constant current portion indicates a constant current is used to charge the battery. A third waveform 306 is the voltage of the battery. Before T4, the voltage of the battery increases gradually. After T4, the voltage of the battery is maintained constant or almost constant. The constant voltage of the battery (from T4 to T7) indicates a constant voltage is used to charge the battery during the time period from T4 to T7.

The complete battery charging process includes three phases as shown in FIG. 3. A first charging phase is from T0 to T1. Before the first charging phase, the battery is depleted. A pre-charge is applied to the battery. Throughout the description, the first charging phase is alternatively referred to as a pre-charge charging phase. The pre-charge charging phase is applied to the battery until the voltage of the battery reaches a predetermined voltage threshold. As shown in FIG. 3, the predetermined voltage threshold is approximately equal to 3.1 V according to one embodiment.

During the pre-charge charging phase, the switched capacitor charger is disabled. The buck charger is enabled. The DC/DC converter is configured to operate in a bypass mode. In the bypass mode, at least one switch (e.g., one high-side switch for a buck converter and two high-side switches for a switched capacitor converter) is configured as an always-on switch. The output voltage of the rectifier is applied to the buck charger through the always-on switch. In some embodiments, the output voltage of the rectifier may be selected for further improving the efficiency of the wireless power transfer system. As shown in FIG. 3, the output voltage of the DC/DC converter is equal to 5 V. S1nce the voltage drop caused by the DC/DC converter can be omitted when the DC/DC converter is configured to operate in the bypass mode, the output voltage of the rectifier is approximately equal to 5 V.

A second charging phase is from T1 to T2. During the second charging phase, a constant current charge is applied to the battery. The constant current charge is carried out by the buck charger. As shown in FIG. 3, the output voltage of the DC/DC converter varies from 5 V to 10 V. The variation of the output voltage of the DC/DC is carried out through leveraging the adaptor's capability of adjusting the supply voltage applied to the transmitter. During the second charging phase, the switched capacitor charger is disabled, and the DC/DC converter is configured to operate in a bypass mode. With the output voltage of the DC/DC converter varying in a range from 5 V to 10 V, the buck charger maintains a constant current applied to the battery.

A third charging phase is from T2 to T3. During the third charging phase, after the output voltage of the DC/DC converter reaches a predetermined voltage threshold (e.g., 10 V as shown in FIG. 3), the DC/DC converter is configured as a 2:1 step-down power conversion device. In response to the change of the DC/DC converter, the output voltage of the DC/DC converter drops to 5 V at T2 as shown in FIG. 3.

From T2 to T3, the output voltage of the rectifier is further increased such that the output of the buck charger could sustain a stable current output with the input voltage greater than four times the battery voltage until T3. At T3, the battery voltage reaches the threshold voltage of initiating a fast charging phase. As shown in FIG. 3, the threshold voltage of initiating a fast charging phase is equal to 3.5 V.

During the second charging phase and the third charging phase, a constant current charge is applied to the battery. As shown in FIG. 3, during T1 to T3, the current flowing through the battery is maintained constant. In some embodiments, the current flowing through the battery is equal to 1 A as shown in FIG. 3. Throughout the description, these two charging phases are collectively referred to as a constant current charging phase.

A fourth charging phase is from T3 to T4. During the fourth charging phase, at T3, the switched capacitor charger is enabled. After a predetermined delay, the buck charger is disabled. The DC/DC converter is configured as a 2:1 power conversion device. The detailed transition between the buck charger and the switched capacitor charger will be described below with respect to FIG. 4.

During the fourth charging phase, the output voltage of the rectifier is further raised such that the charging currents at the output of the chargers reach the fast charging constant current target, which is a charging current limit of the wireless power transfer system. As shown in FIG. 3, the charging current limit is about 4 A. After the fast charging current is reached, the wireless charging system maintains the current flowing through the battery by gradually raising the output voltage of the rectifier. During the fourth charging phase, the voltage of the battery is raised gradually to a voltage level close to 8 V, which is the over-voltage protection point of the wireless power transfer system. During the fourth charging phase, a variety of control methods can be used for achieving the fast charging current.

During the fourth charging phase, the buck charger is replaced by the switched capacitor charger. More particularly, a system controller first enables the switched capacitor charger at T3, and disables the buck charger after a predetermined delay. Throughout the description, the fourth charging phase is alternatively referred to as a first charger transition period.

A fifth charging phase is from T4 to T5. During the fifth charging phase, the switched capacitor charger is configured to operate in a constant voltage charging mode. In this mode, the wireless power transfer system maintains the voltage of the battery constant. As the charging current reduces as indicated by the second waveform 304, the voltage drop along the charging path is reduced. In response to the reduced voltage drop, the output of the rectifier is controlled to gradually reduce as the battery is being replenished. During the fifth charging phase, a variety of control methods can be used during this phase for the constant voltage tracking involving both transmitter and receiver sides of the wireless power transfer system.

A sixth charging phase is from T5 to T6. During the sixth charging phase, when the current flowing through the battery is lower than a predetermined current threshold, the current control accuracy of the switched capacitor charger is degrading. In some embodiments, the predetermined current threshold is about 2 A as shown in FIG. 3. At T5, in order to complete the constant voltage charging, the system controller enables the buck charger. After a predetermined delay, the system controller disables the switched capacitor charger. During the sixth charging phase, the DC/DC converter is configured as a 2:1 power conversion device. The detailed transition between the buck charger and the switched capacitor charger will be described below with respect to FIG. 4.

After the buck charger has been enabled, the output voltage of the rectifier is gradually lowered to a lower voltage (e.g., 10 V) at T6. After passing through the DC/DC converter, the output of the DC/DC converter is about 5 V as shown in FIG. 3. From T5 to T6, the buck charger continues to maintain a constant voltage charging through leveraging its closed loop regulation capability. At T6, the DC/DC converter is configured to operate in a bypass mode again.

During the sixth charging phase, the switched capacitor charger is replaced by the buck charger. More particularly, the system controller first enables the buck charger at T5, and disables the switched capacitor charger after a predetermined delay. Throughout the description, the sixth charging phase is alternatively referred to as a second charger transition period.

A seventh charging phase is from T6 to T7. During the seventh charging phase, after the DC/DC converter is configured to operate in the bypass mode, the output voltage of the rectifier is reduced from 10 V to 5 V as shown in FIG. 3. The seventh charging phase is a constant voltage trickle charging phase.

During the fifth charging phase, the sixth charging phase and the seventh charging phase, a constant voltage charge is applied to the battery. As shown in FIG. 3, during T4 to T7, the voltage of the battery is maintained constant or almost constant. In some embodiments, the voltage of the battery is approximately equal to 7.8 V as shown in FIG. 3. Throughout the description, these three charging phases are collectively referred to as a constant voltage charging phase.

The seven charging phases shown in FIG. 3 are merely examples, which should not unduly limit the scope of the claims. One of ordinary skill in the art would recognize many variations, alternatives, and modifications. For example, depending on different design needs and applications, various charging phases illustrated in FIG. 3 may be added, removed, replaced, rearranged and repeated.

Figure 4:
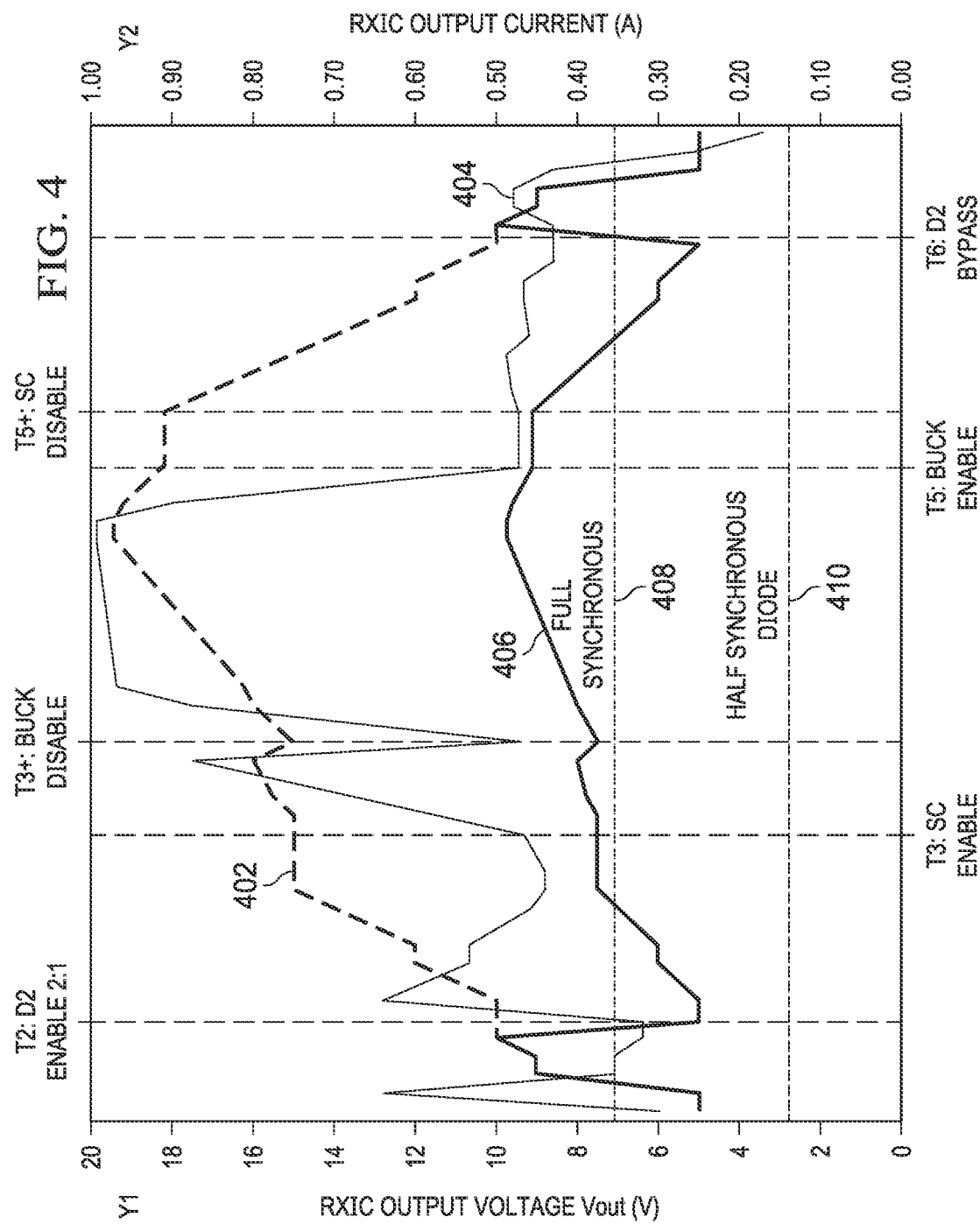
FIG. 4 illustrates another exemplary charging profile of the wireless power transfer system shown in FIG. 2 in accordance with various embodiments of the present disclosure.

FIG. 4 illustrates another exemplary charging profile of the wireless power transfer system shown in FIG. 2 in accordance with various embodiments of the present disclosure. The horizontal axis of FIG. 4 represents intervals of time. There are two vertical axes. The first vertical axis Y1 represents the output voltage of the rectifier. The second vertical axis Y2 represents the current flowing through the rectifier.

FIG. 4 illustrates three waveforms. A first waveform 402 is the output voltage of the rectifier. A second waveform 404 is the current flowing through the rectifier. A third waveform 406 is the output voltage of the DC/DC converter. FIG. 4 illustrates two transition points. A first transition point occurs at T2, which is the same as T2 shown in FIG. 3. Before T2, the DC/DC converter is configured to operate in a bypass mode. As a result of having the bypass mode, the output voltage of the DC/DC converter is approximately equal to the output voltage of the rectifier. As shown in FIG. 4, the voltage of DC/DC converter (third waveform 406) tracks with the voltage of the rectifier (first waveform 402). At T2, the DC/DC converter leaves the bypass mode and enters into a 2:1 power conversion mode. From T2 to T6, the DC/DC operates in the 2:1 power conversion mode. The output voltage of the DC/DC converter (third waveform 406) is one half of the output voltage of the rectifier (first waveform 402). A second transition point occurs at T6. At the second transition point, the DC/DC converter leaves the 2:1 power conversion mode and returns to the bypass mode.

FIG. 4 further illustrates the transition between the buck charger and the switched capacitor charger. At T3, the switched capacitor charger is enabled before the buck charger is disabled at T3+. The time between T3 and T3+ is a first predetermined delay, which may vary depending on different applications and design needs. During the time period from T3 to T3+, the switched charger and the switched capacitor charger are connected in parallel and charge the battery simultaneously. During the time period from T3 to T3+, the current limit function of the battery charging control may be used to smooth the transition between the buck charger and the switched capacitor charger At T5, the buck charger is enabled before the switched capacitor is disabled at T5+. The time between T5 and T5+ is a second predetermined delay, which may vary depending on different applications and design needs. During the time period from T5 to T5+, the switched charger and the switched capacitor charger are connected in parallel and charge the battery simultaneously. During the time period from T5 to T5+, the current limit function of the battery charging control may be used to smooth the transition between the buck charger and the switched capacitor charger.

FIG. 4 further illustrates a first dashed line 408 and a second dashed line 410. The first dashed line 408 represents the current threshold for maintaining the rectifier to operate in a full synchronous rectifier mode. The full synchronous rectifier mode is well known in the art, and hence is not discussed herein. As shown in FIG. 4, the current threshold for maintaining the rectifier to operate in a full synchronous rectifier mode is approximately equal to 0.35 A. In other words, the rectifier operates in the full synchronous rectifier mode when the current flowing through the rectifier is greater than 0.35 A.

The second dashed line 410 represents a boundary between a diode mode and a half synchronous rectifier mode. In the diode mode, all switches of the rectifier emulate diodes of a diode rectifier. In the half synchronous rectifier mode, at least one of the switches emulates a diode of the diode rectifier. As shown in FIG. 4, the boundary between the diode mode and the half synchronous rectifier mode is about 0.15 A.

One advantageous feature of having the transitions between the buck charger and the switched capacitor converter shown in FIG. 4 is that the current flowing through the rectifier can be maintained at a level greater than the current threshold for staying in the full synchronous rectifier mode. Maintaining the rectifier to stay in the full synchronous rectifier mode during the transitions helps to improve the performance of the wireless power transfer system. For example, the full synchronous rectifier mode may help to improve the transient response performance of the wireless power transfer system.

Figure 5:
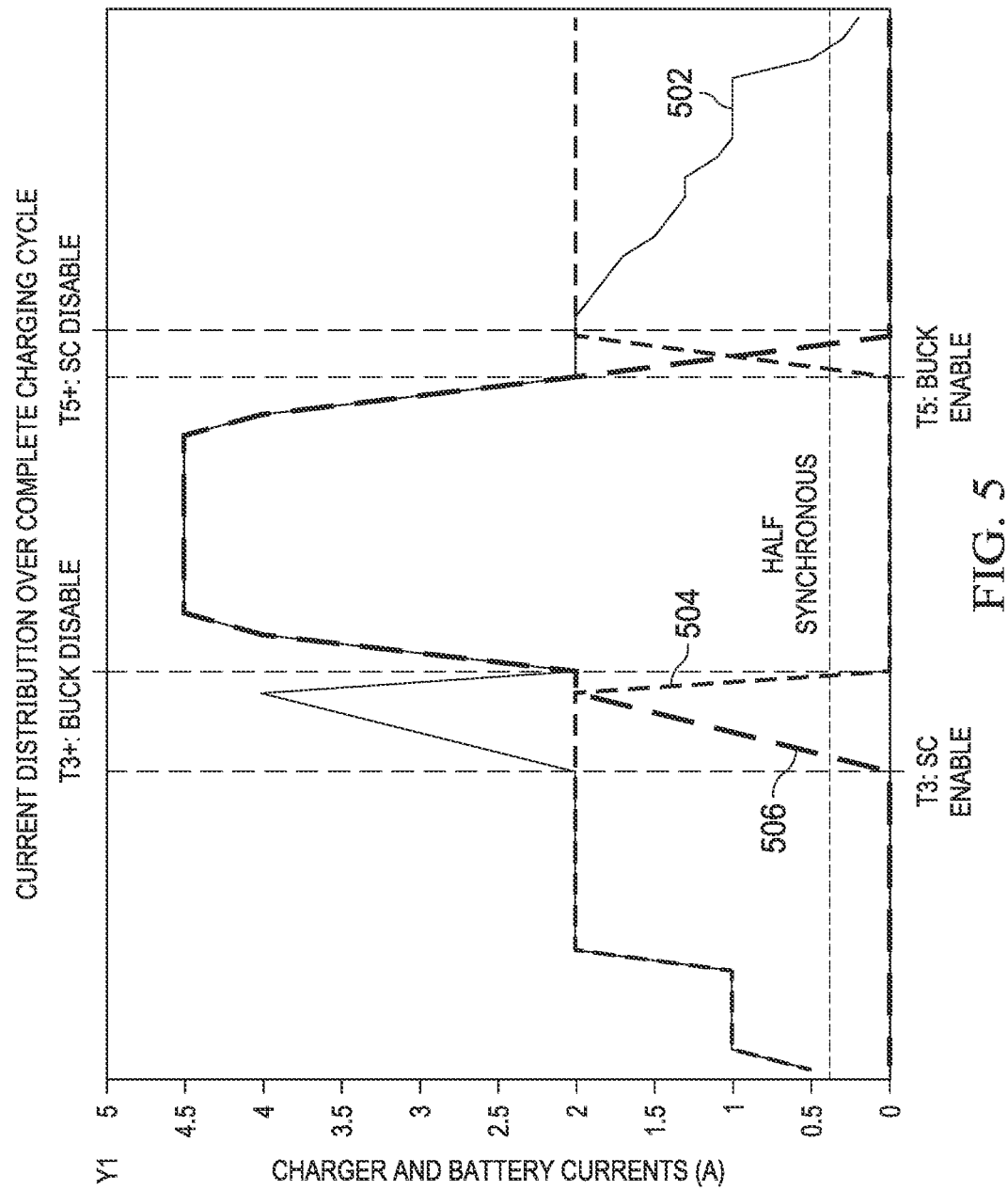
FIG. 5 illustrates yet another exemplary charging profile of the wireless power transfer system shown in FIG. 2 in accordance with various embodiments of the present disclosure.

FIG. 5 illustrates yet another exemplary charging profile of the wireless power transfer system shown in FIG. 2 in accordance with various embodiments of the present disclosure. The horizontal axis of FIG. 5 represents intervals of time. The vertical axis Y1 represents the current flowing through the battery and the currents flowing through the chargers.

FIG. 5 illustrates three waveforms. A first waveform 502 is the current flowing through the battery. A second waveform 504 is the current flowing through the buck charger. A third waveform 506 is the current flowing through the switched capacitor charger. FIG. 5 illustrates two transition periods. A first transition period is from T3 to T3+. During the first transition period, the system controller first enables the switched capacitor converter at T3, and then disables the buck charger at T3+. A second transition period is from T5 to T5+. During the second transition period, the system controller first enables the buck converter at T5, and then disables the switched capacitor charger at T5+.

FIG. 5 illustrates the current distribution between the buck charger and the switched capacitor charger during the two transition periods. At T3, during the transition from the buck charger to the switched capacitor charger, the output voltage of the rectifier is about four times greater than the voltage of the battery. As a result of having a high output voltage from the rectifier, the switched capacitor charger can be properly turned on. After turning on the switched capacitor charger, the current flowing through the switched capacitor charger is raised by raising the output voltage of the rectifier. At the same time, the current flowing through the buck charger is kept the same or slowly decreasing though adjusting the current limit of the buck charger. In other words, the current limit function of the battery charging control may be used to smooth the transition between the buck charger and the switched capacitor charger. Once the current flowing through the switched capacitor charger is sufficiently high, the current flowing through the buck charger can be reduced to zero before the buck charger is disabled at T3+ as shown in FIG. 5.

Similarly at T5, the buck charger is enabled first before the switched capacitor charger is disabled. Then the current through the buck charger is gradually raised while the current through the switched capacitor charger is kept the same or decreased. Once the current through the buck charger is increased sufficiently high, at T5+, the switched capacitor charger is disabled. Again the current limit of the buck charger at which the switched capacitor charger is disabled is selected to make sure that the output current of the rectifier does not go below the threshold for maintaining the full synchronous rectifier mode.

Figure 6:
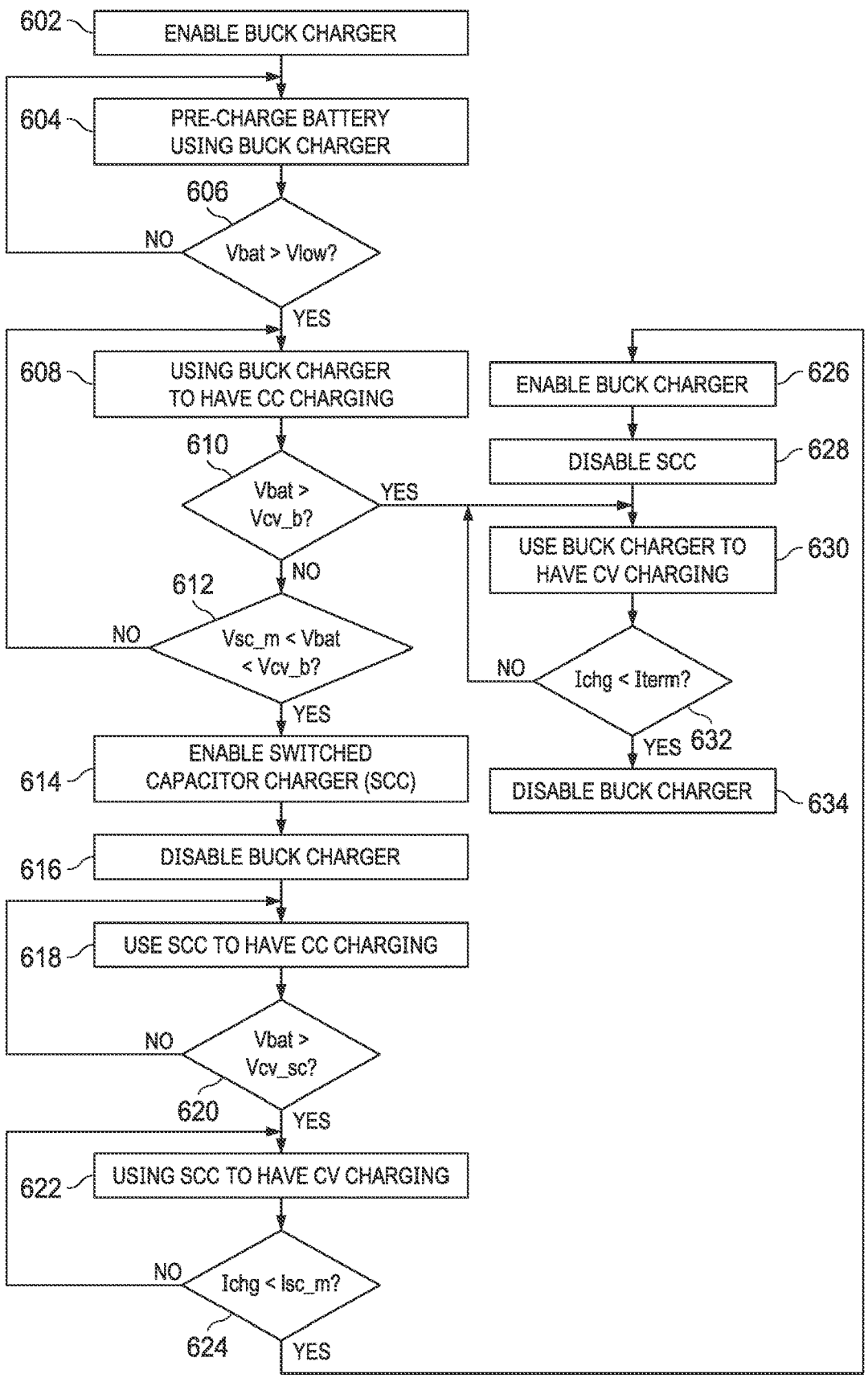
FIG. 6 illustrates a flow chart of a method for charging a battery through the wireless power transfer system shown in FIG. 2 in accordance with various embodiments of the present disclosure.

FIG. 6 illustrates a flow chart of a method for charging a battery through the wireless power transfer system shown in FIG. 2 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

A wireless power transfer system comprises a transmitter and a receiver magnetically coupled together through an inductive coupling. The rectifier of the receiver convers an AC voltage of the receiver coil into a DC voltage. A DC/DC converter is connected to the output of the rectifier. A buck charger and a switched capacitor charger are connected in parallel between the output of the DC/DC converter and a load. In some embodiments, the load is a rechargeable battery.

At step 602, the buck charger is enabled. At the same time, a battery charging current limit can be set equal to a pre-charge current limit.

At step 604 the buck charger applies a pre-charge to the battery. During the time of applying the pre-charge to the battery, the battery charging current limit can be set equal to be equal a constant current charge limit.

At step 606, a system controller determines whether the battery charging voltage (Vbat) exceeds a first voltage threshold (Vlow). The first voltage threshold can also be referred to as a pre-charge voltage threshold. If the battery charging voltage exceeds the first voltage threshold, the method proceeds with step 608. Otherwise, the method returns to step 604.

At step 608, the buck charger applies a constant current charging to the battery. During the constant current charging, the battery charging current is kept constant, and the battery charging voltage (Vbat) is gradually increased.

At step 610, the system controller determines whether the battery charging voltage (Vbat) exceeds a second voltage threshold (Vcv_b). The second voltage threshold is the voltage threshold for applying a constant voltage charging through the buck charger. If the battery charging voltage exceeds the second voltage threshold, the method jumps to step 630. Otherwise, the method proceeds with step 612.

At step 612, the system controller determines whether the battery charging voltage (Vbat) is between a third voltage threshold (Vsc_m) and the second voltage threshold (Vcv_b). The third voltage threshold Vsc_m is the voltage threshold for enabling the switched capacitor charger. If the battery charging voltage is not in the range from Vsc_m to Vcv_b, the method returns to step 608. Otherwise, the method proceeds with step 614.

At step 614, the switched capacitor charger is enabled. After a first predetermined delay, the buck charger is disabled at step 616. At step 618, the switched capacitor charger is used to charge the battery while maintaining the battery charging current constant.

At step 620, the system controller determines whether the battery charging voltage (Vbat) exceeds a fourth voltage threshold (Vcv_sc). The fourth voltage threshold is a voltage threshold for entering into a constant voltage charging through the switched capacitor charger. If the battery charging voltage exceeds the fourth voltage threshold, the method proceeds with step 622. Otherwise, the method returns to step 618.

At step 622 the switched capacitor charger is used to charge the battery while maintaining the battery charging voltage (Vbat) generally constant. At step 624, the system controller determines whether the current flowing through the battery (Ichg) is less than a first current threshold (Isc_m). The first current threshold is a current threshold for enabling the buck charger and disabling switched capacitor charger. If the current flowing through the battery is greater than the first current threshold, the method returns to step 622. Otherwise, the method proceeds with step 626.

At step 626, the buck charger is enabled. After a second predetermined delay, the switched capacitor charger is disabled at step 628. At step 630, the buck charger is used to charge the battery while maintaining the battery charging voltage (Vbat) generally constant.

At step 632, the system controller determines whether the current flowing through the battery (Ichg) is less than a second current threshold (Iterm). The second current threshold is a current threshold for terminating the battery charging. If the current flowing through the battery is less than the second current threshold, the method proceeds with step 634. Otherwise, the method returns to step 630. At step 634, the buck charger is disabled, and the charging stops because the battery is fully charged.

The steps described with reference to FIG. 6 can be performed by one or more controller, including, e.g., the PD controller 202, the PD controller 204, and/or the AP 214. In some embodiments, the AP 214 can be used to perform, or at least oversee, a majority of the steps described with reference to FIG. 6. The PD controller 202 and/or the PD controller 204 can also help perform certain steps. Other variations are also possible.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method comprising:
   charging a battery through a first charger and a second charger connected in parallel;
   during a first transition from a constant current charging phase to a constant voltage charging phase, enabling the second charger at a first time instant and disabling the first charger at a second time instant, the second time instant being after the first time instant, wherein the first charger and the second charger are configured to charge the battery simultaneously between the first time instant and the second time instant; and
   during the constant voltage charging phase, enabling the first charger at a third time instant upon detecting that a current flowing the battery is less than a predetermined current threshold and disabling the second charger at a fourth time instant, the fourth time instant being after the third time instant, wherein the first charger and the second charger are configured to charge the battery simultaneously between the third time instant and the fourth time instant.

2. The method of claim 1, wherein the first charger is a buck converter, and the second charger is a switched capacitor converter.

3. The method of claim 1, wherein power for charging the battery is from a wireless power transfer system comprising:
   a transmitter circuit connected between an output of an adaptor and a transmitter coil;
   a rectifier connected to a receiver coil magnetically coupled to the transmitter coil;
   a DC/DC converter having inputs connected to outputs of the rectifier; and
   the first charger and the second charger connected in parallel between the DC/DC converter and the battery.

4. The method of claim 3, further comprising:
   applying a pre-charge charging phase to the battery upon detecting that a voltage of the battery is below a first voltage threshold;
   applying the constant current charging phase to the battery upon detecting that the voltage of the battery is between the first voltage threshold and a second voltage threshold;
   applying a fast current charging phase to the battery after the voltage of the battery is greater than the second voltage threshold;
   maintaining a current flowing through the battery approximately equal to a battery current charging limit, while increasing the voltage of the battery, upon detecting that the current flowing through the battery has reached the battery current charging limit; and applying the constant voltage charging phase to the battery upon detecting that the voltage of the battery reaches a third voltage threshold.

5. The method of claim 3, further comprising:
during the constant voltage charging phase, enabling the first charger upon detecting that the current flowing through the battery drops below the predetermined current threshold.

6. The method of claim 3, further comprising:
during the constant current charging phase, configuring the DC/DC converter to operate in a bypass mode upon detecting that a voltage of the battery is less than a predetermined voltage threshold; and
configuring the DC/DC converter to operate as a 2:1 power conversion device upon detecting that the voltage of the battery is greater than the predetermined voltage threshold.

7. The method of claim 3, further comprising:
during the constant voltage charging phase, configuring the DC/DC converter to operate as a 2:1 power conversion device upon detecting that a voltage of the battery is greater than a predetermined voltage threshold; and
configuring the DC/DC converter to operate in a bypass mode upon detecting that the first charger has entered into a trickle charging mode.

8. The method of claim 3, further comprising:
converting an AC voltage from an AC power supply into a DC voltage through the adaptor; and
transmitting power wirelessly from the transmitter circuit to the rectifier.

9. The method of claim 3, wherein the first charger is a closed-loop DC/DC converter, and the second charger is an open-loop DC/DC converter.

10. The method of claim 3, further comprising:
during the constant current charging phase and the constant voltage charging phase, configuring the rectifier to operate in a synchronous rectifier mode through enabling the second charger before disabling the first charger during the first transition, and enabling the first charger before disabling the second charger during the constant voltage charging phase.

11. A system comprising:
a rectifier configured to receive power wirelessly from a transmitter through a transmitter coil and receiver coil;
a direct current (DC) to DC (DC/DC) converter coupled, directly or indirectly, to the rectifier, the DC/DC converter configured to accept an output voltage from an output of the rectifier;
a closed-loop charger and an open-loop charger connected in parallel between an output of the DC/DC converter and a load; and
a controller coupled, directly or indirectly, to the closed-loop charger and the open-loop charger, the controller configured to selectively enable one of the closed-loop charger and the open-loop charger during different charging phases, and enable both the closed-loop charger and the open-loop charger during a transition period between the different charging phases.

12. The system of claim 11, wherein the closed-loop charger comprises a buck charger, the open-loop charger comprises a switched capacitor charger, and the DC/DC converter is a 2:1 power converter.

13. The system of claim 11, wherein the closed-loop charger is enabled during a constant current charging phase, the open-loop charger is enabled during a constant voltage charging phase, and the closed-loop charger and the open-loop charger are configured to charge a battery simultaneously during the transition period between the constant current charging phase and the constant voltage charging phase.

14. A method comprising:
receiving power wirelessly at a rectifier from a transmitter through an inductive coupling formed by a transmitter coil and a receiver coil;
generating a direct current (DC) voltage by the rectifier;
applying the DC voltage to a closed-loop charger and an open-loop charger through a DC to DC (DC/DC) converter;
during a first charger transition period, enabling the open-loop charger before disabling the closed-loop charger, wherein as a result of enabling the open-loop charger before disabling the closed-loop charger, the closed-loop charger and the open-loop charger are configured to charge a battery simultaneously during the first charger transition period; and
during a second charger transition period, enabling the closed-loop charger before disabling the open-loop charger, wherein as a result of enabling the closed-loop charger before disabling the open-loop charger, the closed-loop charger and the open-loop charger are configured to charge the battery simultaneously during the second charger transition period.

15. The method of claim 14, further comprising:
charging the battery to a targeted voltage through a pre-charge charging phase, a constant current charging phase, a constant voltage charging phase and a trickle charging phase.

16. The method of claim 15, wherein the first charger transition period occurs between the constant current charging phase and the constant voltage charging phase.

17. The method of claim 15, wherein the second charger transition period occurs in the constant voltage charging phase.

18. The method of claim 14, wherein the closed-loop charger comprises a buck charger, the open-loop charger comprises a switched capacitor charger, and the DC/DC converter is a 2:1 power conversion device.

19. The method of claim 14, further comprising:
configuring the DC/DC converter to leave a bypass mode and enter into a 2:1 power conversion mode upon detecting that an output voltage of the DC/DC converter reaches a predetermined threshold.

20. The method of claim 14, wherein:
the closed-loop charger and the open-loop charger are connected in parallel between an output of the DC/DC converter and the battery.

* * * * *